United States Patent [19]
Collado et al.

[11] Patent Number: 5,996,625
[45] Date of Patent: Dec. 7, 1999

[54] ASSEMBLY FOR CONTROLLING AND DISPENSING GAS FOR A CONTAINER OF PRESSURIZED GAS

[75] Inventors: Pedro Collado, Ozoir la Ferriere; Olivier Victor, Savigny sur Orge; Gérard Lhomer, Le Mesnil Saint Denis; Christian Bleys, Livry sur Seine, all of France

[73] Assignee: Taema, Antony, France

[21] Appl. No.: 08/864,351

[22] Filed: May 28, 1997

[30] Foreign Application Priority Data

Jun. 5, 1996 [FR] France ................................ 96 06925

[51] Int. Cl.⁶ .................................................. F16K 31/12
[52] U.S. Cl. .................... 137/614.19; 137/556; 137/613; 137/505.25; 251/251; 251/252
[58] Field of Search ............................. 137/613, 614.19, 137/556, 505.25; 251/251, 252

[56] References Cited

U.S. PATENT DOCUMENTS

| | | | |
|---|---|---|---|
| 2,972,466 | 2/1961 | Allen et al. | 137/614.19 |
| 3,472,292 | 10/1969 | Godfrey | 137/505.25 |
| 4,173,986 | 11/1979 | Martin | 137/505.25 |
| 4,655,246 | 4/1987 | Phlipot et al. | 137/505.25 |
| 4,898,210 | 2/1990 | Nitta | 137/614.19 |
| 5,566,713 | 10/1996 | Lhomer et al. | 137/614.19 |
| 5,665,894 | 9/1997 | Baker | 137/614.19 |

FOREIGN PATENT DOCUMENTS

| | | |
|---|---|---|
| 0 417 882 | 3/1991 | European Pat. Off. . |
| 0 629 937 | 12/1994 | European Pat. Off. . |
| 97742 | 1/1897 | Germany ............ 137/505.25 |

*Primary Examiner*—A. Michael Chambers
*Attorney, Agent, or Firm*—Young & Thompson

[57] ABSTRACT

The assembly includes a body in which there is formed a bore (3) for letting in gas under pressure, containing an isolation valve (4) exposed to the gas under pressure, at least one pressure reducer (5), an element (9) for selecting and regulating the flow rate through at least one outlet (8) for gas at reduced pressure, and a tubular member (11) for controlling the isolation valve sitting on top of the body. The isolation valve is a spool (4) which can be moved back and forth in a transverse housing (26) in the body and the opposite ends of which interact directly with curved guide ramps (18, 19) formed by the tubular control member. The direct control of the isolation spool (4) by turning the tubular member (11) simplifies the architecture of the assembly and reduces the manufacturing and servicing costs thereof. The assembly is useful in transporting bottles of gas, especially of medical oxygen.

15 Claims, 5 Drawing Sheets

ASSEMBLY FOR CONTROLLING AND DISPENSING GAS FOR A CONTAINER OF PRESSURIZED GAS

FIELD OF THE INVENTION

The subject of the present invention is an assembly for controlling and dispensing gas, designed to be connected to a container containing gas under pressure, for example a gas for medical use such as oxygen, of the type including a body in which there is formed a passage for letting the gas into the container, containing an isolation valve exposed to the gas at high pressure, a pressure reducer, means for selecting and regulating the flow rate through at least one outlet for gas at reduced pressure, this assembly also comprising a tubular member for controlling the isolation valve which sits on top of the body.

BACKGROUND OF THE INVENTION

A control assembly of this type is described in document EP-A-0,629,937. In this prior-art control assembly, the tubular member contains a subassembly which can be moved longitudinally by turning the tubular control member by means of appropriate cutouts forming cams, and this movement in turn controls the axial movement of the isolation valve. This structure is relatively complex and therefore expensive.

Furthermore, the valve for discharging the remaining compressed gas, which valve is arranged on the side of this structure, can have only a small diameter. This therefore means that it has to be actuated by a substantial variation in pressure (2 to 3×10$^5$ Pa), which means that this valve has to be set laboriously. Its cost of manufacture is also relatively high on account of the number of components and machining operations required. In this prior-art control assembly too, the passage holes in the disc of the flow rate selector are longitudinally offset from the low-pressure gas outlet and have to be produced by a chemical means on account of their very small diameter (of the order of 0.1 mm for the first hole), these chemical boring means being very expensive. Finally, this technology requires extremely tight piercing tolerances on these holes (of the order of 1 micron).

SUMMARY OF THE INVENTION

The object of the invention is to propose an assembly of the aforementioned type for controlling and dispensing gas but which is of simplified construction and lower cost.

In accordance with the invention, the isolation valve consists of a spool which can move transversely in a housing in the body and the opposed ends of which interact directly with curved guide ramps formed by the tubular control member and shaped in such a way that turning the tubular member causes a translational movement of the spool transversely to the axis in one direction or in the opposite direction depending on the direction in which the tubular member is turned.

Such a system with a transversely-sliding spool interacting directly with the tubular control member is far simpler and has a cost of manufacture which is lower than the axially-sliding subassembly for controlling the isolation valve in the assembly of the aforementioned document.

According to one feature of the invention, the assembly comprises means for preventing a low-pressure gas flow rate from being selected while the isolation valve is closed, and conversely for preventing the isolation valve from being closed while the means for selecting the flow rate are open.

Thus a measure of safety in the use of the gas from the container is provided, which safety measure was not obtained with the assembly described in the aforementioned prior-art patent.

According to another advantageous feature of the invention, the assembly includes a discharge valve mounted in the body coaxially to the reducer, the valve and the reducer being housed in a recess in the body which communicates with the outside through openings formed in the body and in the tubular member for controlling the isolation valve.

This arrangement makes it possible to dispense with the spring on the side valve of the assembly of the prior-art European patent, thanks to the fact that the spring of the reducer simultaneously provides the two functions of pressure reduction and of controlling the discharge valve. This single spring requires just one setting, and what is more the manufacture of this part of the control assembly is thereby simplified and its cost therefore reduced.

According to another feature of the invention, the assembly further includes a filling valve including a cage which can move axially in a stepped bore and internally defines a chamber of the same inside diameter as a reduced-diameter portion of the stepped bore and receives a part of the valve element carrying the seal in order to receive and accommodate this seal when the valve element is moved from its closed position.

With such an arrangement, the annular seal becomes placed away from the tubular component before the valve element effectively opens and is thus mechanically and thermally protected by the cage against the undesirable effects of the ingress of foreign particles and the high temperature which results from the rapid adiabatic compression of the filling gas as the circuits between the source of pressurized gas and the interior volume of the container open.

BRIEF DESCRIPTION OF THE DRAWINGS

Other specific features and advantages of the invention will be revealed during the description which will follow, given with reference to the appended drawings which illustrate one embodiment thereof by way of non-limiting example.

DETAILED DESCRIPTION OF THE INVENTION

Figure 1:
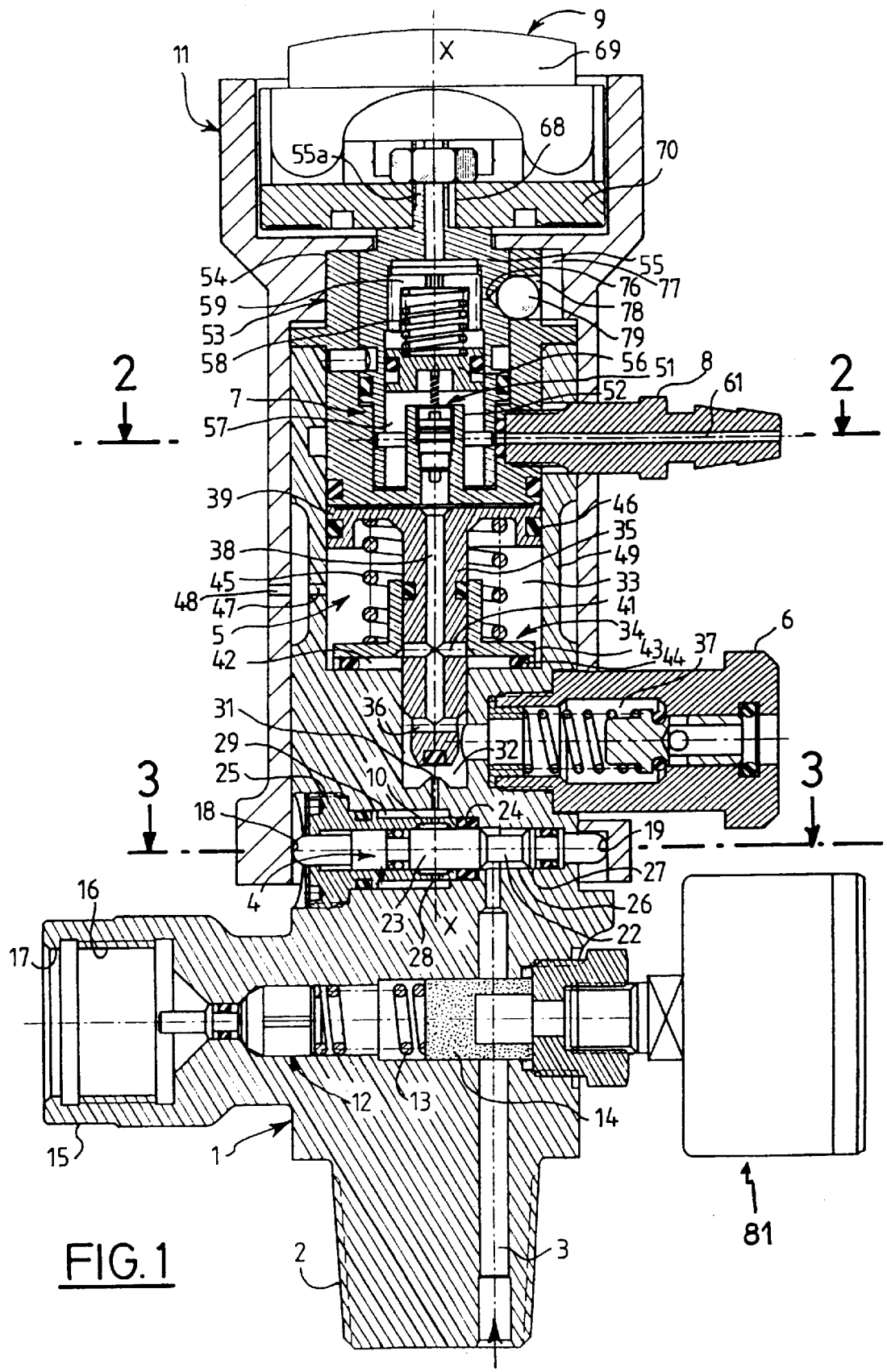
FIG. 1 is a view in longitudinal section of an assembly for controlling and dispensing gas according to the invention.

The assembly for controlling and dispensing gas as represented in the drawings is designed to be connected to a container (not represented), or more specifically a bottle containing gas at high pressure, especially a gas for medical use, typically oxygen.

This control assembly comprises an elongate body 1, a lower end 2 of which is threaded so that it can be screwed into a corresponding tapped opening of the container inlet, and in which there is formed a longitudinal bore 3 for letting the gas into the container. Arranged in the body 1 are an isolation valve 4 exposed to the gas at high pressure coming through the bore 3, a pressure reducer 5 arranged downstream of the spool 4 and a side connector 6 for letting out gas at medium pressure.

The assembly also comprises a second reducing stage 7 placed downstream of the reducer 5 and situated facing a connector 8 for letting out gas at reduced pressure (that is to say at a pressure greater than atmospheric pressure), a device 9 for selecting and regulating the flow rate of low-pressure gas through the connector 8, and a tubular member 11 sitting on top of an upper tubular part of the body 1 and with the same longitudinal axis X—X as this upper part and containing the isolation valve 4, the reducer 5, the second reducing stage 7 and the flow rate selector 9.

The means of filling the container 1 comprise a valve 12 mounted in a transverse stepped bore of the body 1 between the threaded end 2 and the spool 4, this valve being urged into the closed position by a spring 13 bearing on a porous filter 14 spanning the bore 3.

The valve 12 emerges in a lateral inlet adaptor 15 in which there is formed a tapping 16 for screwing in a connector for connecting to a filling container, this adaptor having an inlet flange 17 the diameter of which is smaller than that of the tapping 16 and preventing any connector which might have the same diameter and same pitch as the tapping 16 from being screwed in, guaranteeing the filling of the container and the adequacy of its contents while in use. In actual fact, filling can be achieved only with a special device like the one described in document FR-A-2,726,346.

The tubular control member 11 sits on top of the upper part of the body 1 and at its lower end facing the isolation valve consisting of the spool 4 has two ramps or opposing surfaces forming cams 18, 19 formed on its interior wall. The ramps 18, 19 are in contact with the rounded opposed ends 4a, 4b projecting out of the body 1 of the spool 4, which is arranged at right angles to the longitudinal axis XX of the body 1 and of the tubular member 11.

The ramps 18, 19 (FIG. 3) are connected together and stretch angularly over most of the internal circumference of the end of the tubular member 11, their opposed ends A, D being separated by an internally-projected angular part 21. The opposed ends 4a, 4b of the spool 4 are rounded in such a way as to make it easier for them to slide along the ramps 18, 19 which are shaped in such a way that turning the tubular member 11 causes a translational movement of the spool 4 transversely in one direction or in the opposite direction depending on the direction in which the tubular member 11 is turned, correspondingly opening or closing the isolation valve 4.

Figure 3:
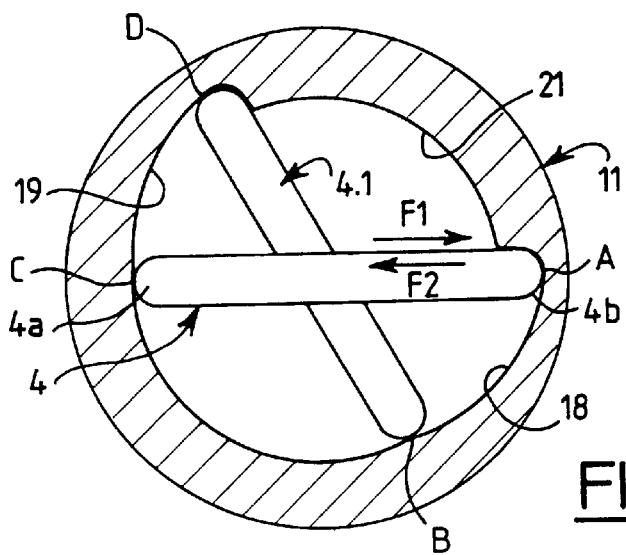
FIG. 3 is a diagrammatic view in transverse section on 3/3 of FIG. 1.

More specifically, it may be seen in FIG. 3 that the ramps 18, 19 are diametrically opposed and that while the radius of curvature of the ramp 18 decreases from its end A to its end B, the radius of curvature of the ramp 19 increases from its end C, diametrically opposite the end A, as far as its end D, diametrically opposite the end B of the ramp 18. The adjacent ends B and C of the ramps are connected by a circular sector of substantially constant radius. It will be understood that in these conditions, turning the member 11 causes a transverse translation of the spool 4 in its housing 26 in the body 1 in one of the two directions indicated by the arrows F1, F2. For the convenience of the description, the second position 4.1 of the spool 4 has been represented as being angularly offset from its first position with its ends 4a, 4b resting against the ends of the shoulder 21, at the points B and D. However, in actual fact the position 4.1 is offset only in terms of translation with respect to the position 4 because it is the member 11 which turns about its axis XX, rather than the spool 4.

As may be seen in FIG. 1, the spool 4 comprises a central part 23 carrying a seal and sliding in a sealed manner in a seal 24 and in a bushing 25 mounted in a transverse stepped bore of the body 1, and which central portion is followed by a section 22 of smaller diameter situated facing the mouth of the inlet bore 3 and which is itself connected to a flange 27 carrying a seal and having the same diameter as the central part 23 and sliding in a reduced-diameter portion 26 of the transverse bore in which the inlet bore 3 emerges. Facing the central part 23 of the spool (in the closed position), the bushing 25 forms an internal chamber 10 and is pierced with radial holes 28 allowing gas to pass from the chamber 10 into a peripheral annular chamber 29 and thence into an axial bore 31 in the body 1 emerging in an axial chamber 32 which itself communicates with a larger-diameter upper chamber 33, which chambers are formed coaxially in the upper part of the body 1. The chambers 32 and 33 contain the upstream reducer 5 as well as the valve 34 for discharging remaining gas, which are arranged as follows. The reducer 5 comprises a cylindrical piston shank 35 one end of which is engaged so that it can slide in the lower chamber 32 and has a transverse bore 36 emerging in the chamber 32, which also communicates with the outlet duct 37 of the connector 6. The bore 36 communicates with a longitudinal duct 38 of the central shank 35, emerging at the opposite end thereof, which shank is extended by a piston 39 mounted so that it can slide in a sealed manner in the upper chamber 33. Made in the central shank 35 is a second transverse bore 41 the opposite ends of which emerge in an intermediate space 42 delimited by the bottom of the chamber 33 and a valve 43 mounted coaxially on the central shank 35. A seal 44 is inserted between the lower face of the valve 43 and the bottom opposite of the chamber 33. The valve 43 is urged against the seal 44 against the bottom by a helical spring 45 coaxial with the valve 43 and with the tubular shank 35 of the reducer 5. The piston 39 slides in leaktight fashion in the chamber 33 thanks to a peripheral seal 46.

The valve device 34 for discharging the residual pressure at the reducer 5 is supplemented by radial holes 47, 48 formed respectively in the tubular wall 49 of the upper part of the body 1 and in the wall of the tubular member 11.

The control and dispensing assembly furthermore comprises, longitudinally downstream of the reducer 5 in the direction of the upper end of the member 11, which is the opposite end to the spool 4, a second reducing stage 7 situated at the low-pressure adaptor 8, which will now be described.

Figure 4:
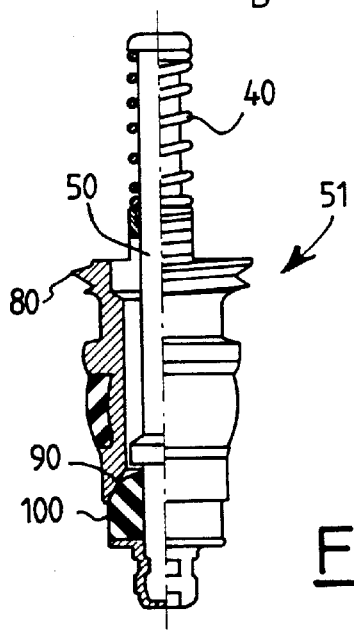
FIG. 4 is a view half in longitudinal section and half in elevation on an enlarged scale of a second reducing valve of the control assembly of FIG. 1.

This second reducing system 7, or downstream reducer, includes a device 51 with a reducing valve (FIGS. 1 and 4) mounted in an axial tubular projection 52 of a tubular body 53 engaged inside the body 1 and onto one end 54 of which the tubular member 11 is fitted. This body 53 is unable to rotate and incapable of axial translation and contains a bell cover 55 inside which the axial projection 52 extends. A piston 56 is mounted so that it can slide in a sealed fashion inside the chamber 57 of the bell cover 55, a helical spring 58 being arranged coaxially to the axis XX and exerting downwards axial thrust on the piston 56. The spring 58 bears against a tubular screw 59 housed in the upper end of the bell cover 55 and which allows the compression of the spring 58 and therefore its thrust against the piston 56 to be adjusted. This adjustment is carried out in such a way that the spring 58 exerts on the piston 56 a thrust which keeps the second reducing valve 51 open so long as no gas is coming from the reducer 5.

Figure 2:
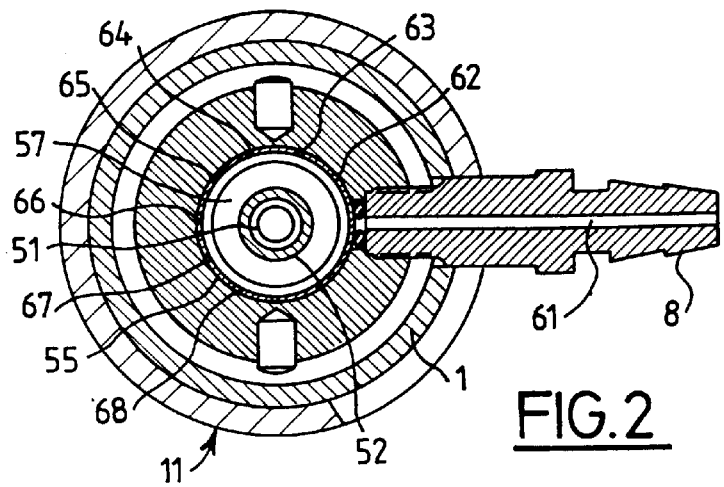
FIG. 2 is a view in transverse section on 2/2 of FIG. 1.

The lower end of the bell cover 55, the opposite end to the spring 58, forms a tubular skirt in which there are arranged, level with the bore 61 of the transverse low-pressure outlet connector 8, a series of radial holes 62 . . . 67 which are angularly offset from one another, there being an appropriate number of these with their diameters increasing starting from the first hole 62. These holes 62 . . . 67 allow the gas which has passed through the second reducing valve 51 to pass into the bore 61 of the low-pressure outlet connector 8 screwed into the tubular body 53 (FIG. 2).

The reducing valve 51 includes (FIG. 4) a tubular body 80 which, at its lower end, forms a seat 90 against which there may bear in sealed manner a seal 100 fixed to an axial rod 50 which is urged upwards into the position in which the valve is closed by a helical spring 40. The upper end of the rod 50 bears against the reducing piston 56. The latter normally maintains on the rod 50 a thrust which is slightly higher than the opposing thrust of the spring 40 which means that the seal 100 is held off the seat 90 and that the valve 51 remains open.

The bell cover 55 has a central upper end 55a which passes through a disc 70 housed in a recess in the upper end of the tubular member 11 and to which it is secured in an appropriate manner, for example by longitudinal flats 68. Provided on the outer face of the disc 70 and along its periphery are numerical markings (not visible in the drawing) regarding the flow rate of low-pressure gas coming out through the connector 8, a manual knob 69 secured to the disc 70 and to the bell cover 55 allowing the chosen value of flow rate to be selected and displayed. A determined flow rate of gas corresponds to each positioning of one of the calibrated holes 62 . . . 67 (FIG. 2) opposite the low-pressure outlet bore 61.

Figure 5:
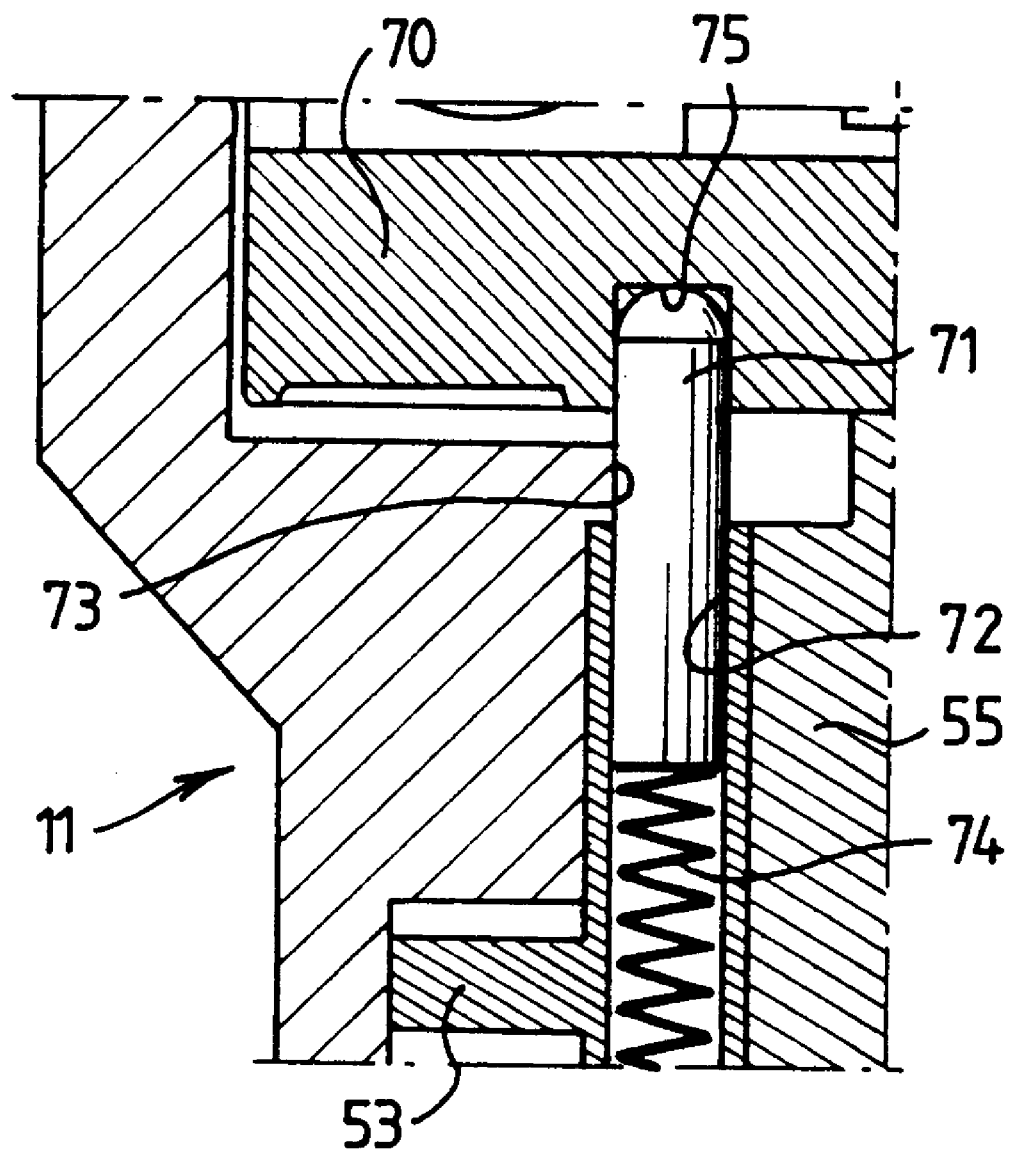
FIG. 5 is a part view in longitudinal section on an enlarged scale of one end of the control assembly of FIG. 1, showing, in an active position, a system for the angular indexing of the device for selecting the flow rate of low-pressure gas.

Associated with this device for selecting and regulating the flow rate of low-pressure gas is an indexing system comprising a longitudinal finger 71 which can slide in a bore 72 of the tubular body 53 which is stationary, concentric with the bell cover 55 (FIGS. 5 and 6) passing through a continuous slot 73 in the tubular control member 11. The finger 71 constitutes an index which is urged elastically by a spring 74 into its deployed position, in which position its end is engaged in one 75 of a series of indentations formed on the periphery of the internal face of the rotary disc 70. The finger or index 71 and the indentations 75, of which there are the same number as there are holes 62 . . . 67, are positioned in such a way that the finger 71 is engaged in an indentation 75 each time a calibrated hole 62 . . . 67 is placed opposite the orifice of the outlet adaptor 61. In FIG. 5, the index 71 is thus engaged in an indentation 75. When the disc 70 is turned, the index 71 is retracted until it reaches the next indentation 75.

The control and dispensing assembly is also provided with means for preventing the selection of a flow rate of low-pressure gas through the adaptor 8 while the isolation valve 4 is closed, and conversely for preventing the valve 4 from being closed while the means 9 for selecting the flow rate are open. In the embodiment represented, these means comprise a first notch 76 arranged in the exterior wall of the bell cover 55 and a second notch 77 formed in the interior wall of the end of the tubular control member 11. These two notches 76, 77 are arranged at the same level and facing a slot 78 formed in the body 53. A ball 79 is housed in the slot 78 and dimensioned in such a way that it is partially engaged either in the notch 76 or in the notch 77, depending on the respective angular position of the bell cover 55 and of the tubular member 11, while the body 53 is stationary. In actual fact, the notches 76 and 77 may be angularly offset by an appropriate angle in such a way that they may or may not lie facing each other. Thus when the ball 78 is engaged in the notch 76 as represented in FIG. 1 it prevents the bell cover 55 from being turned using the knob 69 and therefore prevents a low-pressure outlet flow rate from being selected, whereas in contrast it is possible to turn the tubular member 11 in order to control the isolation valve 4. Furthermore, for an appropriate angular position of the member 11, the notch 77 comes opposite the ball 78. It therefore becomes possible to turn the bell cover 55 using the knob 69 in such a way as to drive the ball 78 out to make it engage partially in the notch 77. From this moment on, the tubular member 11 is prevented from rotating and the isolation spool 4 can therefore no longer be actuated whereas by contrast the means 9 for selecting the low-pressure outlet flow rate may be actuated, because the ball 78 is no longer engaged in the notch 76 and is no longer opposing the rotation of the bell cover 55.

It will therefore be understood that this arrangement provides greater safety in using the control and dispensing assembly.

This assembly works as follows. Gas coming from the container enters the bore 3 as indicated by the arrow (FIG. 1) while the valve 12 is obviously in the position closing the adaptor 15. The gas reaches the annular housing 26 between the central segment 23 and the flange 27. In FIG. 1, the spool 4 is represented in a closed position which means that the high-pressure gas cannot reach the annular volume 10 left between the central part 23 and the bushing 25.

When the control member 11 is turned in the appropriate direction, bearing in mind the orientation of the guide ramps 18, 19, the spool 4 is made to move in translation in the direction which moves it to the left in FIG. 1. Its central part 23 then reaches a position (not represented) in which it frees a passage for the gas from the housing 26 into the annular chamber 10 whence, through the holes 28, it enters the bore 31, the chamber 32, the bores 36, 38, 41, the chamber 42. Depending on the force applied by the compressed gas to the valve 34, which force is proportional to the cross-section of this valve and to the diameter of the seal 43, the valve 34 may lift and allow some of the gas to pass to be discharged to the outside via the orifices 47 and 48.

The medium-pressure gas in the chamber 32 may be discharged directly by the medium-pressure outlet adaptor 6. The medium-pressure gas can also pass through the reducer 5, come opposite the second reducing valve 51, through which it passes to fill the chamber 57. The slight increase in pressure in this chamber therefore exerts on the piston 56 a thrust which closes the valve 51, and from there, the low-pressure gas (at a pressure slightly higher than atmospheric pressure) is discharged through the low-pressure outlet connector 8 at a flow rate which is regulated by the choice of one of the holes 62 . . . 67 positioned facing the outlet bore 61 by turning the bell cover 55 using the manual knob 69. As soon as the pressure in the chamber 57 has dropped, the piston 56 again opens the valve 51 and so on. The operator reads the selected marking which corresponds to the chosen outlet flow rate off the outer face of the disc 70.

The indexing of the finger 71 in one of the indentations 75 corresponds to each selected value of outlet flow rate. During the operation of selecting the flow rate, the tubular member 11 cannot be turned because of the safety system consisting of the ball 78 and the notches 76, 77, as described earlier.

Thanks to the fact that the holes 62 . . . 67 (the number of which may obviously vary) are formed in such a way as to come opposite the low pressure outlet 8, these holes can be made with a mechanical drill bit and therefore in a way which is far less expensive than the holes in the aforementioned European patent which have to be obtained by chemical means. In actual fact, the holes 62 . . . 67 can be produced with a tolerance of the order of 1/100 mm, whereas this tolerance was of the order of a micron for the holes of the prior-art device, which means that these holes can be better controlled, as can the machining and flow rate tolerances.

Furthermore, the pressure within the gas container may range from $200 \times 10^5$ Pa to $10 \times 10^5$ Pa. At the outlet of the first reducer 5, the gas pressure may vary by a few hundreds of millibar, and at that of the second reducer 7, this variation in pressure may be brought down to a few tens of millibar approximately. Thus total control over the flow rate is had thanks to the arrangement of a second reducer 7 which makes it possible to obtain a practically constant outlet pressure irrespective of the flow rate drawn off. As already indicated, the fact that the reducer 5 and the valve 34 for discharging the remaining gas pressure are combined into a single device plays a part in appreciably simplifying the production of the dispensing assembly, and therefore in reducing the cost of its manufacture.

As mentioned above, a container equipped with a control and dispensing assembly according to the invention is filled using filling means which essentially comprise the valve element 12 mounted so that it can move axially in a stepped bore 120 formed transversely in the lower part of the body 1, cutting across the inlet passage 3 and passing through the body so as to allow a high-pressure pressure gauge 81 to be mounted on its opposite end to the valve 12.

Figure 6:
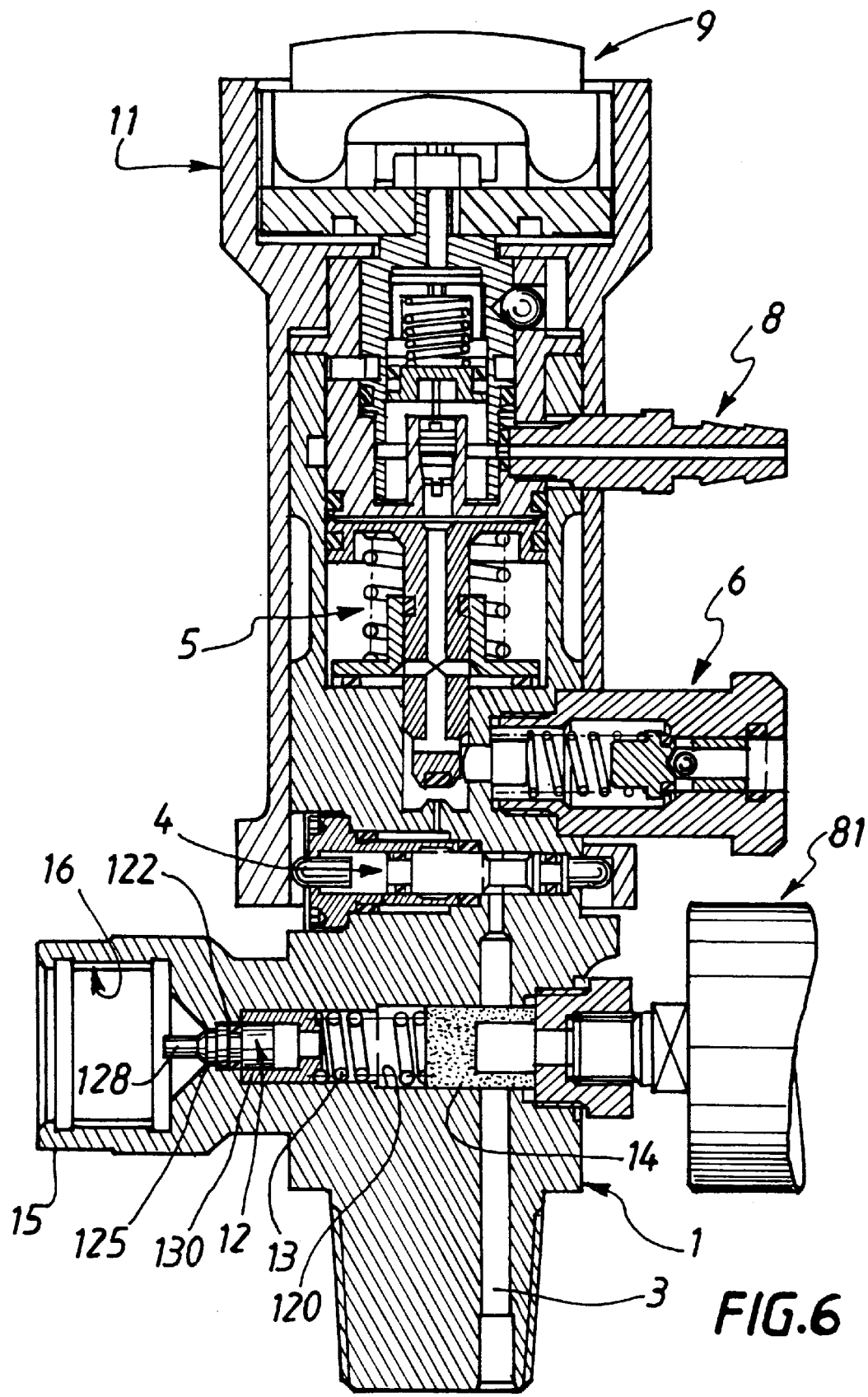
FIG. 6 is a sectional view similar to FIG. 1 of an assembly incorporating a preferred alternative form of filler valve; and, FIGS. 7 and 8 are views in part section showing the sequence of the opening of the filler valve of FIG. 6.
Figure 7:
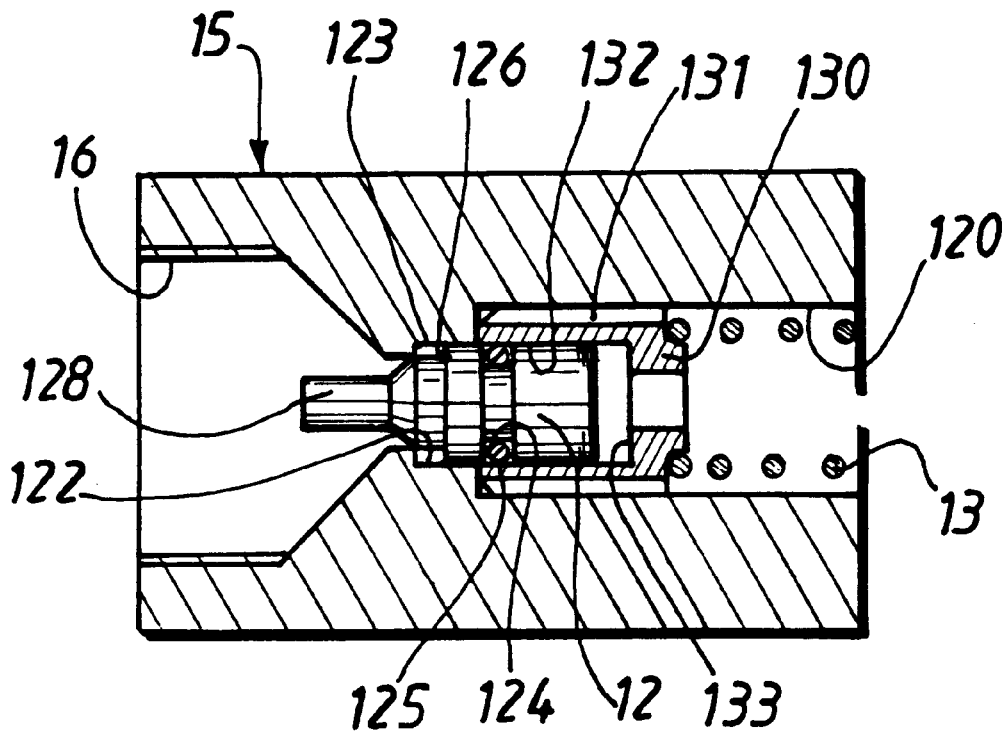
Figure 8:
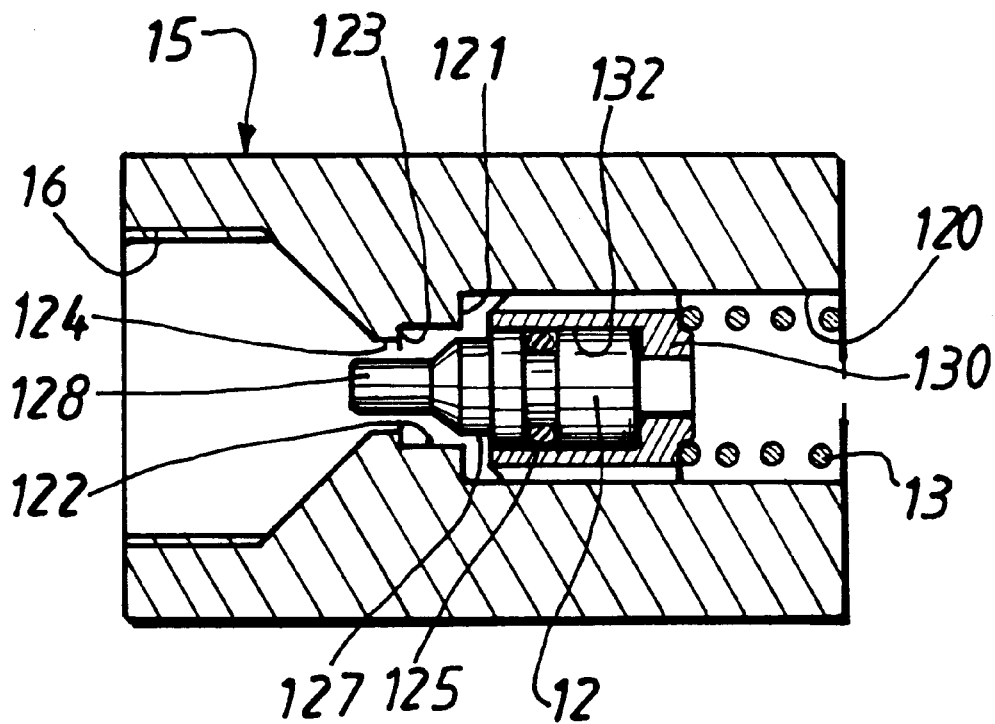

As best seen in FIGS. 6 to 8, the stepped bore 120 advantageously comprises a straight cylindrical internal part which, towards the inlet, is connected, via a first radial shoulder 121, with a first reduced-diameter part 122 which is connected, via a second radial shoulder 123 with a second reduced-diameter part forming a throat 124 which then widens greatly to connect with the tapping 16 of the connection adaptor 15 used for mounting the filling equipment which mechanically shifts the valve element 12 into its open position.

As best seen in FIGS. 7 and 8, the valve element 12 includes a rear main body part with a diameter which corresponds substantially to the diameter of the first reduced-diameter part 122 and in which there is formed an annular groove 124 accommodating the annular seal 125 which normally, when the valve is in the closed position, interacts with the wall of the reduced-diameter portion 122 of the bore 120. The main part of the body of the valve element is extended towards the front, beyond a radial shoulder 126, by an intermediate reduced-diameter part 127 with a diameter corresponding substantially to that of the throat 124 and itself extended by a front end shank 128 projecting from the neck 124 to interact with the filling equipment when the latter is fitted in the bore 16.

According to one aspect of the invention, the filling valve means further includes a metal cage 130 mounted so that it can slide in the main part of the stepped bore 120 and including axial passages 131 on the outside. The cage 130 has an internal chamber open towards the front and laterally delimited by a bore 132 having the same diameter as the first reduced-diameter portion 122, and partially, at the rear, by a radial shoulder 133. The cage 130 is axially urged to press via its front end against the shoulder 121 by the spring 13 arranged in the stepped bore 120 and bearing against a filter 14 arranged at the intersection between the bore 120 and the passage 3 and extending across this passage.

The filler valve according to the invention works as follows:

In the closed position represented in FIG. 1, the valve element 12 is pressed, by the residual pressure in the container, with its front shoulder 126 pressed against the shoulder 123 of the stepped bore and with the seal 125 interacting in sealed fashion with the wall of the first reduced-diameter portion 122 of the stepped bore. The cage 130 is pressed by the spring 13 against the shoulder 121, with the central shoulder 133 some distance from the rear face of the valve element 12.

As the filling equipment is fitted into the tapping 16, this equipment, by bearing against the shank 128, pushes the valve element 12 towards the back of the stepped bore (to the right in FIGS. 6 to 8).

First of all, as represented in FIG. 8, the valve element 12 is retracted by a distance which is such that the seal 125 leaves the reduced-diameter portion 122 of the stepped bore to be accommodated in the bore 132 of the cage 130, the rear face of the valve element 12 still being separated from the shoulder 133.

Thereafter, with the valve element 12 continuing to be pushed back inwards, the rear end face of the valve element 12 comes to bear against the internal shoulder 133 of the cage 130, any additional travel of the valve element 12 therefore occuring with the cage 130 being driven along against the action of the spring 13, completely freeing the passage of gas from the outside to the inside of the stepped bore and then, via the filter 14 and inlet passage 3 into the container.

It will be understood that as soon as it reaches the configuration of FIG. 8, the seal 125 becomes housed in the cage 130, the seal remaining in the shelter thereof once access to the stepped bore is wide open and remaining thus throughout the filling sequence, the cage 130, as stated earlier, thus acting as a screen to provide both mechanical and thermal protection.

We claim:

1. A gas controlling and dispensing assembly for connection to a container containing said gas under pressure, the assembly comprising:

a main body having a longitudinal axis, and serially arranged, a gas inlet passage formed in the main body, opening into the container and containing an isolation valve exposed to the gas under pressure in the container; at least one pressure reducer; and flow selecting means for selecting and regulating the flow rate of gas from the container and exiting at reduced pressure through at least one gas outlet;

a tubular control member for controlling actuation of the isolation valve, said tubular control member surrounding at least part of the main body and being coaxial therewith;

said isolation valve comprising a spool arranged to move transversely in a transversal recess formed in the main body and having at least one end projecting out of the main body and adapted to cooperate in engagement with a curved ramp means formed in the tubular control member and shaped in such a way that rotation of the tubular member around said longitudinal axis causes a translational movement of the spool transversely to said axis.

2. The assembly of claim 1, wherein the spool has a second opposite end projecting out of the main body, each end cooperating in engagement with a curved ramp means formed diametrally opposed in the tubular control member, such that said rotation causes a movement of the spool in one transverse direction or in an opposite direction depending on the direction of rotation of the tubular member.

3. The assembly according to claim 1, further comprising locking means for preventing a low-pressure gas flow rate from being selected while the isolation valve is closed, and conversely for preventing the isolation valve from being closed while the flow selecting means are open.

4. The assembly according to claim 3, wherein the locking means comprise a first notch arranged in an outer wall of a bell cover which rotates integrally with a rotary member for controlling the selection of the flow rate, said bell cover being arranged inside a stationary tubular body engaged coaxially in the main body, a second notch formed in an inside wall of an end of the tubular control member and a slot in the bell cover facing the notches and containing a ball adapted to interact with the notches.

5. The assembly according to claim 1, further comprising a discharge valve which is urged elastically and mounted in the main body coaxially to the reducer, the discharge valve and the reducer being housed in a recess in the main body which communicates with the outside through openings respectively in the main body and in the tubular member for controlling the isolation valve.

6. The assembly according to claim 1, wherein the flow selecting means comprise second reducing means delivering low-pressure gas to a low-pressure gas outlet.

7. The assembly according to claim 6, wherein the second reducing means include a device with a pressure-reducing valve placed downstream of the reducer, associated with a spring for returning a valve stem to a closed position, the stem resting against a low-pressure regulating piston slidably mounted in a bell cover coaxial with the main body, rotating integrally with a knob for manual selection of the outlet flow rate and pierced with calibrated holes adapted to be positioned angularly opposite the low-pressure gas outlet.

8. The assembly according to claim 7, further comprising a stationary tubular body concentric with the bell cover and having an elastically retractable longitudinal finger adapted to be urged into a position in which an end of said finger is engaged in one of a series of indentations formed on the periphery of an internal face of a rotating disc carrying markings to indicate the outlet flow rate and which rotates, together with the bell cover, integrally with the knob for selecting the outlet flow rate, the finger and the indentations being positioned in such a way that the finger is engaged in an indentation each time a calibrated hole is placed opposite the low-pressure gas outlet.

9. The assembly according to claim 1, further comprising filling means for filling the container, said filling means having a valve element mounted in the main body between the container and the spool, and a lateral inlet adaptor having an interior tapping for screwing in a connector, said inlet adaptor including an inlet flange having a diameter which is smaller than that of the tapping.

10. The assembly according to claim 9, wherein the filling means comprise a stepped bore communicating with the inlet passage, the valve element axially sliding in said inlet passage, and having an annular seal which, in a closed position, interacts with a reduced-diameter portion of the stepped bore, said valve element being structured and arranged to move mechanically from the outside against the action of an elastic member towards an open position, and a cage structured and arranged to move axially in the stepped bore and defining a cylindrical chamber having the same inside diameter as the reduced-diameter portion of the stepped bore, the valve element carrying the annular seal having a part which extends into the chamber so as to accommodate said annular seal when the valve element is moved from its closed position.

11. The assembly according to claim 10, wherein the cage includes an internal shoulder structured and arranged to interact in bearing with a rear face of the valve element, as the valve element is mechanically moved.

12. The assembly according to claim 10, wherein the elastic member bears axially on the cage.

13. The assembly according to claim 12, wherein the elastic member bears axially against a filter arranged in the stepped bore.

14. The assembly according to claim 13, wherein the filter extends across the inlet passage.

15. The assembly according to claim 14, further comprising a pressure gauge mounted in said stepped bore.

* * * * *